United States Patent [19]
Capehart

[11] 3,840,076
[45] Oct. 8, 1974

[54] IMPLEMENT GUIDING SYSTEM FOR ROW CROPS

[76] Inventor: Pinnell S. Capehart, Box G, Holland, Mo. 63853

[22] Filed: Nov. 9, 1972

[21] Appl. No.: 305,075

[52] U.S. Cl............. 172/1, 104/244.1, 172/26, 280/87.2
[51] Int. Cl............. A01b 79/00, A01b 69/00
[58] Field of Search........ 172/23, 26, 176, 1, 387, 172/393, 394; 280/87.2; 104/244.1; 180/79; 111/61, 83

[56] References Cited
UNITED STATES PATENTS

| | | | |
|---|---|---|---|
| 841,315 | 1/1907 | Everett | 172/176 |
| 1,331,403 | 2/1920 | Thompson | 104/244.1 |
| 1,723,073 | 8/1929 | Poll | 172/26 |
| 1,781,670 | 11/1930 | Smethers et al. | 172/26 |
| 1,822,711 | 9/1931 | Silver | 172/394 |
| 2,061,348 | 11/1936 | Cogdill | 111/83 |
| 2,520,680 | 8/1950 | Hamilton | 172/26 |
| 2,555,793 | 6/1951 | Frye | 104/244.1 |
| 2,880,937 | 4/1959 | King | 172/26 X |
| 3,235,009 | 2/1966 | Nelson | 172/26 X |
| 3,351,151 | 11/1967 | Miller et al. | 280/87.2 X |

FOREIGN PATENTS OR APPLICATIONS

| | | | |
|---|---|---|---|
| 248,534 | 1/1964 | Australia | 172/26 |

*Primary Examiner*—Robert E. Pulfrey
*Assistant Examiner*—Paul T. Sewell
*Attorney, Agent, or Firm*—Bacon & Thomas

[57] ABSTRACT

A first implement establishes and fixes the position and direction of row crops in a field by trenching, hilling, seeding or the like. That same implement cuts a fairly deep narrow slit in the soil in precisely spaced parallel relation to the rows. Processing implements to be used later, such as planters, cultivators, choppers, harvesters, or the like are each provided with a rotatable lenticular disc held, by the weight of the implement, in the slit formed by the first implement to force such processing implement to precisely follow the rows. In some cases the implement may be a tractor itself, carrying row establishing or processing means.

3 Claims, 6 Drawing Figures

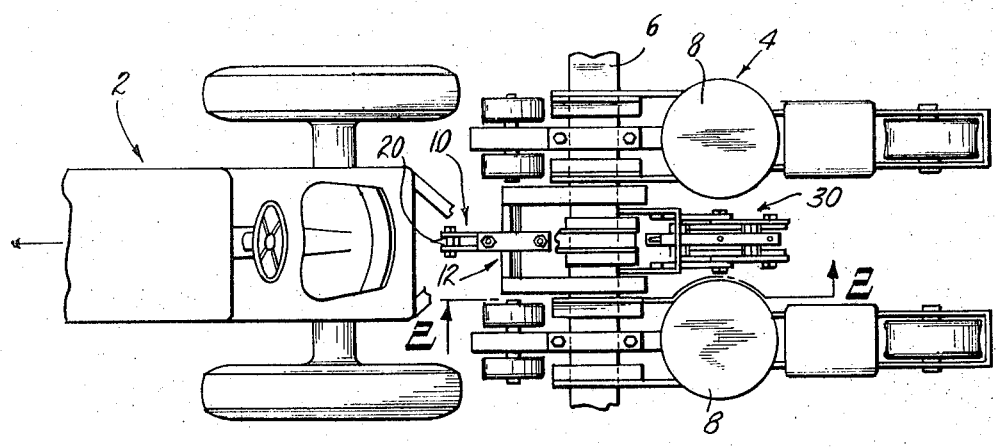
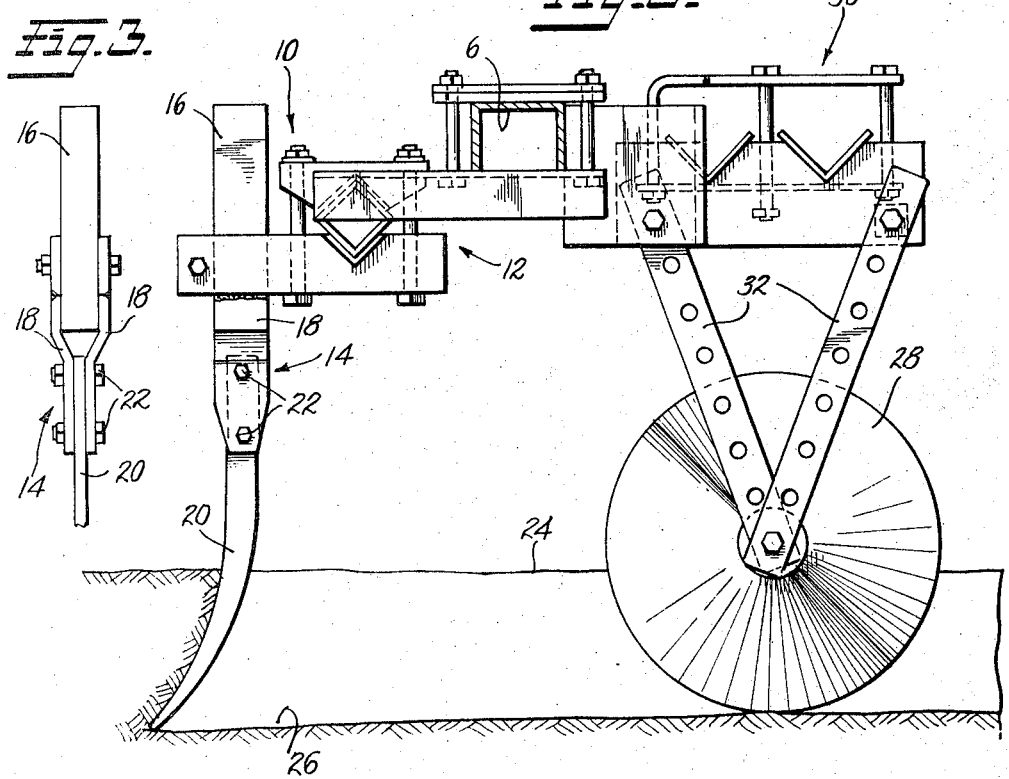

IMPLEMENT GUIDING SYSTEM FOR ROW CROPS

BACKGROUND OF THE INVENTION

This invention relates to a guiding system for guiding farm implements along row crops.

Many farm products are raised in what are known as row crops, that is, the plants are grown in parallel rows traversing a field. It is usually necessary, after the plants are in place, to further process the crops, such as by spraying, weeding, cultivating or harvesting. The planting and processing are usually done by power operated machinery capable of working on a multiplicity of rows at the same time. It is, of course, essential that the processing implements be accurately guided along paths parallel to the rows to avoid damage to desired growing plants and yet effective to perform the desired processing. Heretofore, it has been necessary for the driver of a tractor, for example, to be constantly alert and exercise great care in driving his tractor along the rows to avoid damage to the growing plants. If the driver would deviate materially from the proper path, many of the plants would be uprooted or damaged undesirably.

SUMMARY OF THE INVENTION

According to the present invention the first implement used to establish the position and direction of the rows may be a trenching device, for making trenches to receive seed or seedlings, a hilling implement to form hills to receive plants or seed or it may be a seeder itself. In any event, the implement usually provides for establishing a multiplicity of rows at each pass across a field. Herein the term "establishing" is meant to include any of such implements and particularly the first one to traverse the field. The first implement which establishes the direction and position of the rows, is provided with a cutter blade fixed thereon in fixed relation to the row forming means and which cuts a relatively deep narrow slit in the soil, preferably between two of the rows. The rows thus being established in exact parallel spaced relationship to the slit. Subsequent processing implements are provided with a lenticular disc rotatably mounted thereon in a fixed position and bearing the same relationship to the row processing means thereon as the described slit in the soil bears to the established rows. The lenticular disc is so positioned that the weight of the implement, a substantial portion of which is obviously supported by the disc presses the disc downwardly a very substantial distance into the ground, in the described slit, and functions to positively guide the implement to follow all changes in direction and/or undulations of the established rows. Thus, the processing implement will accurately follow along the rows of plants for performing whatever process is desired at that time.

If desired, such a lenticular disc may be mounted on the first implement itself to follow behind the cutting blade and thus firmly compact the sides of the slit to more or less permanently establish the guiding slot. It has been found that a slit formed as described will maintain its identity throughout the growing season even through rain, wind and other weather conditions so that it remains effective to guide implements even though some loose soil may apparently fill the guide slit. In any event, each processing implement renews the guide slit for later use by a further implement.

In one embodiment of the invention it is contemplated that the cutting blade be mounted at the front end of a tractor drawing an implement for establishing the row crops and for further processing at later times the cutting blade is replaced by the described lenticular disc. In this instance, hydraulic or other means are provided to forcibly project the disc into the soil or slit sufficiently to relieve the steerable front wheels of the tractor of a large portion of their normal weight so that the disc following the slit can actually forcibly cause the tractor to follow the pre-established rows.

BRIEF DESCRIPTION OF THE DRAWINGS

FIG. 1 is a fragmentary top plan view of a tractor towing an implement for seeding row crops;

FIG. 2 is an enlarged sectional view taken along the line 2—2 of FIG. 1;

FIG. 3 is a fragmentary front elevational view of a portion of FIG. 2;

DESCRIPTION OF THE PREFERRED EMBODIMENTS

Figure 4:
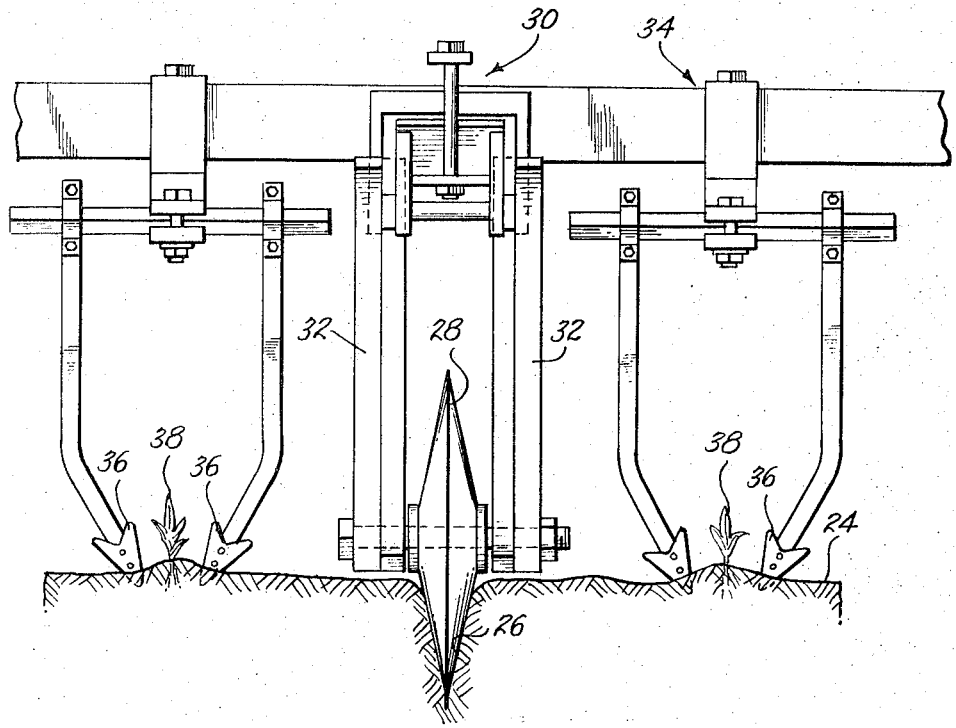
FIG. 4 is a fragmentary front view of an exemplary processing implement for practicing the present invention.

In FIG. 1, a tractor fragmentarily shown at 2 is attached by suitable draw bar means to an implement 4, shown in this instance as a seeder of known and familiar construction. The seeder is provided with a main frame bar 6 to which a plurality of spaced seeding devices 8 are fixed. As is known, when the seeding implement is drawn over the soil by the tractor 2, it deposits seeds in rows across the field. FIG. 1 shows a seeder merely as an example of an implement for establishing the rows of row crops but may well be any other suitable implement, depending on the particular crop to be planted. Irrespective of what implement is being used, the same is provided with a cutter blade 10 fixedly secured thereon, as generally shown in FIG. 2. A bracket structure designated generally as at 12 is clamped to the frame bar 6 of the row establishing implement and securely clamped thereto is a downwardly projecting cutter blade 14. As shown in FIGS. 2 and 3, the cutter blade 14 preferably comprises a shank 16 having strap means 18 thereon, the lower ends of which removably embrace a cutter blade 20. Preferably, the cutter blade 20 is of hardened wear-resisting material whereas the shank 16 and straps 18 may be of ordinary steel, thus reducing the cost of the apparatus and rendering it easy to remove the cutter blade 20 for replacement, repair or reconditioning. The blade 20 is removably held between straps 18 by suitable bolts 22. As shown, the lower end of the cutter blade 20 extends downwardly a very substantial distance into soil 24, preferably to a depth of the order of eight to ten inches, depending upon the nature of the particular soil in that field.

It will be obvious that as the tractor 2 progresses across the field and the implement 4 establishes a plurality of parallel rows of crops, the cutter blade 20 will form a slit 26 in the soil that is always parallel to the rows of crops as established and always spaced the same distance from the adjacent rows. This is obviously true in spite of any deviations or changes in direction made by the implement 4 during its traverse across the field. The formation of the slit 26 is all that is essential at this time although applicant has found it advantageous in some instances to provide the implement 4 with a lenticular disc 28 journalled thereon for rotation in a vertical fore-and-aft plane directly behind the cutter blade 20. The disc 28 is mounted on a suitable bracket structure 30 having adjustable struts 32 so that the disc 28 penetrates the slit 26 substantially to the bottom thereof. Since the disc 28 is provided with an outer periphery defining a relatively sharp edge and a much thicker central portion and conical sides, it will be apparent that the disc 28 following in the narrow slit cut by blade 20 will compact the soil at the sides of the slit 26 and leave a narrow, generally V-shaped open slit greater depth than width capable of retaining its own identity and guiding capability during a growing season even though loose soil may apparently fill the same during rain or wind storms or other weather conditions. FIG. 4 illustrates the shape of the lenticular disc 28 that may be used on the implement establishing the rows of crops.

After the direction and position of the rows is established, such as by trenching or the planting of seedlings or spaced seeds, the further processing of the field must be done with subsequent implements accurately following the established rows. Whether the subsequent processing be the actual planting of seedlings, cultivating the coil, chemically treating the soil or plants for insects, weeding, "chopping" seedlings to thin the rows or other processing, it is necessary that the processing implement accurately follow the established rows. This is accomplished in a manner illustrated generally and schematically in FIG. 4 wherein numeral 34 designates generally a cultivator, having cultivator means 36 intended to disturb the soil on each side of the rows of plants 38. The implement 34 is provided with a bracket structure, which may be identical to the bracket structure 30 of FIG. 2, which rotatably journals the lenticular disc already described in position to support a substantial portion of the weight of the implement and to project a substantial distance downwardly into the soil 24. As shown in FIG. 4, the disc 28 is in the trench or slit 26 initially formed by the implement that established the rows of plants 38. Such implements as that schematically shown in FIG. 4, are usually towed in trailing relation to a tractor whereby the implement is capable of limited lateral movement relative to the tractor. In view of the rugged construction of the adjustable struts 32 and the bracket 30, the lateral position of the disc 28 relative to the implement 34 is rigidly fixed and the disc 28 following the slit 26 will positively guide the implement 34 by moving the same laterally in non-steering response to follow all changes in direction or undulations of the rows of plants 38 and the cultivating means 36 will thus be maintained at all times in predetermined fixed relation to the plants 38 of the established rows. Such means as the bracket 30 and disc 28 will also be mounted on any subsequently used implement for further or different processing of the rows of crops.

Figure 5:
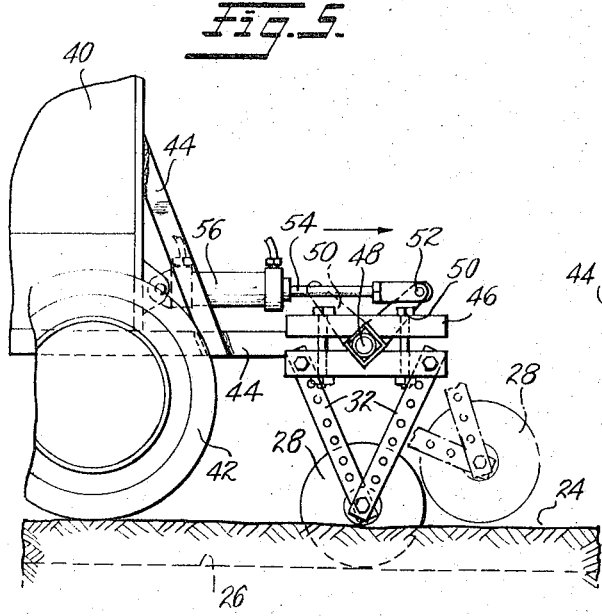
FIG. 5 is a fragmentary side view of a portion of a tractor embodying the present invention.
Figure 6:
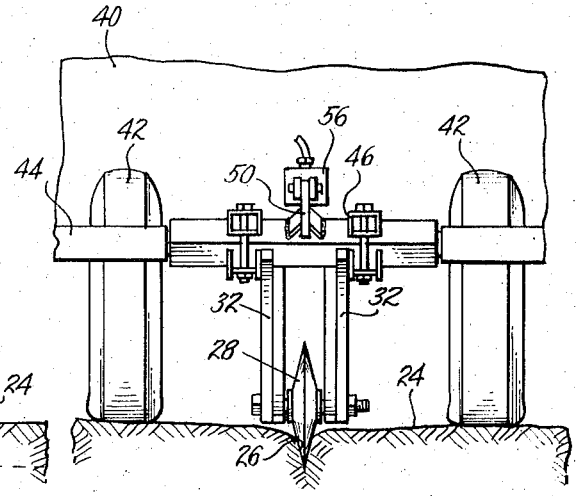
FIG. 6 is a front view of the apparatus of FIG. 5.

In many instances the implements for establishing and processing row crops are mounted directly on tractors and are usually incapable of lateral movement relative to the tractor. In such instances, it is desirable that the tractor itself be forcibly guided to accurately follow previously established rows. FIGS. 5 and 6 illustrate an arrangement for accomplishing this result. In FIGS. 5 and 6 the front end of a tractor fragmentarily shown at 40 is provided with steerable front wheels 42. It is contemplated that a bracket structure 44 extending forwardly from the tractor 40 be initially provided with the cutting blade assembly, as shown at 10–20 in FIG. 2, for the initial traverse of the field, during which the crop rows are established by whatever implement is then mounted on the tractor. Thus, irrespective of deviations or undulations of the tractor path, the described cutting blade will cut a slit 26 as already described and it is not necessary that the operator of the tractor be exceptionally careful to establish straight rows. When the tractor 40 is being used to carry implements for further processing of the previously established rows, the described cutting blade is replaced by a bracket structure 46 mounted on the forwardly extending bracket 44 for pivotal movement about a horizontal axis established by trunions 48. The bracket 46 carries struts 32, as already described, which rotatably support a lenticular disc 28, as already described. The bracket structure 46 includes a lever 50 fixed to the bracket 46 and the upper end of which is pivotally joined, at 52, to the end of a piston rod 54 of a hydraulic motor 56. When the motor 56 is actuated to project the rod 54 forwardly, the bracket 46 is rotated to the full line position of FIG. 5 and when the rod 54 is drawn rearwardly, the bracket 46 is pivoted to the dotted line position wherein disc 28 is drawn upwardly clear of the soil 24. The parts are preferably so dimensioned and the struts 32 so adjusted that when the disc 28 is forced downwardly to the full line position, it is forced to the bottom of the slit 26 with sufficient force to relieve the front end of the tractor 40 of a substantial portion of weight normally on wheels 42. Thus, the wheels 42 do not offer material resistance to lateral guiding forces produced when the disc 28 follows undulations in the slit 26. Thus, after establishing the rows of crops, the tractor 40 may be used to carry processing implements along the rows and be accurately guided along those rows by the disc 28 in the manner already described without the necessity of the tractor operator giving full attention to the steering of the tractor and without danger of deviations that could result in unwanted destruction of parts of the row crops.

The use of a guide disc on the tractor, as described, is not limited to those cases where implements are carried wholly by the tractor. Even when a tractor is used to tow a ground-supported implement having its own guide wheel 28 (as shown in FIG. 4), the use of a further guide wheel on the tractor, as described, is advantageous since it relieves the operator of having to carefully steer the tractor along the rows.

While a limited number of embodiments of the invention have been shown and described, the same are merely exemplary of the principles involved and other forms may be resorted to within the scope of the appended claims.

We claim:

1. The method of establishing and processing row crops comprising the steps of:

moving a first implement over a field to establish a plurality of parallel crop rows;

causing said implement to form a continuous narrow weather resistant slit of greater depth than width and of a depth of the order of 8 to 10 inches in the soil of said field in precisely fixed predetermined laterally spaced relation between two adjacent crop rows established by said implement and simultaneously with the establishment of said rows;

causing a sharp edged lenticular disc to laterally engage the generally upright sides of said slit to laterally compact same; and thereafter directing a bodily laterally movable implement over said field generally along said slit for processing said row crops and causing a sharp edged lenticular disc on said other implement to enter simultaneously engage the opposite compacted sides of said slit, and follow said slit and support a substantial portion of the weight of said other implement to thereby bodily and directly move said other implement laterally in response to changes in direction of said slit whereby said other implement precisely follows the direction and all undulations of the crop rows established by said first implement.

2. An implement having means for processing row crops in a field having spaced parallel rows of crops thereacross and a narrow slit in the soil between certain rows and precisely parallel to and spaced from said certain rows; and a sharp edged lenticular disc rotatably mounted on said implement in fixed relation to said processing means and in position to rotate in a generally vertical fore-and-aft plane, said disc being positioned to support a substantial portion of the weight of said implement and to enter, simultaneously enage the opposite sides of, and be guided by said slit to thereby precisely and bodily move said implement laterally in response to changes in direction of said slit and thereby maintain said processing means in predetermined relationahip to their respective rows, said implement being a wheeled tractor having steerable front wheels, said disc being mounted of said tractor adjacent the front end thereof on a bracket structure separate from said steerable front wheels, and control means for forcibly raising and lowering said disc relative to said tractor whereby said disc may be pushed downardly into said slit with sufficient force to relieve said front wheels of a substantial portion of the tractor weight normally thereon.

3. An implement as defined in claim 2 wherein said control means comprises a hydraulic motor on said tractor.

\* \* \* \* \*